(12) United States Patent
Komori

(10) Patent No.: US 10,302,754 B1
(45) Date of Patent: May 28, 2019

(54) OBJECT RECOGNITION DEVICE

(71) Applicant: TOYOTA JIDOSHA KABUSHIKI KAISHA, Toyota-shi, Aichi-ken (JP)

(72) Inventor: Terumoto Komori, Sunto-gun (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/139,237

(22) Filed: Sep. 24, 2018

(30) Foreign Application Priority Data

Nov. 24, 2017 (JP) .................. 2017-225972

(51) Int. Cl.
| | | |
|---|---|---|
| *G06K 9/00* | (2006.01) | |
| *G01S 13/50* | (2006.01) | |
| *G01S 13/86* | (2006.01) | |
| *B60R 1/00* | (2006.01) | |
| *G06T 7/73* | (2017.01) | |
| *G01S 13/06* | (2006.01) | |

(52) U.S. Cl.
CPC ............... *G01S 13/50* (2013.01); *B60R 1/00* (2013.01); *G01S 13/06* (2013.01); *G01S 13/865* (2013.01); *G01S 13/867* (2013.01); *G06T 7/73* (2017.01); *B60R 2300/301* (2013.01); *B60R 2300/302* (2013.01); *G06T 2207/30256* (2013.01); *G06T 2207/30261* (2013.01)

(58) Field of Classification Search
USPC .................................. 340/435, 903; 701/301
See application file for complete search history.

(56) References Cited

U.S. PATENT DOCUMENTS

| | | | | |
|---|---|---|---|---|
| 2011/0248880 | A1* | 10/2011 | Miyahara | G01S 7/4802 342/54 |
| 2014/0139369 | A1 | 5/2014 | Baba | |
| 2017/0076599 | A1* | 3/2017 | Gupta | B60Q 9/00 |
| 2018/0285659 | A1* | 10/2018 | Kwant | G06K 9/00798 |

FOREIGN PATENT DOCUMENTS

JP          5812064 B2    11/2015

* cited by examiner

*Primary Examiner* — Brent Swarthout
(74) *Attorney, Agent, or Firm* — Sughrue Mion, PLLC

(57) ABSTRACT

The solid object fusion portion includes a lane slope estimation portion, a grouping area set portion and an identity determination portion. The lane slope estimation portion performs estimate processing to estimate a lane slope angle θ in a detecting position of a solid object detected by an autonomous recognition sensor. The grouping area set portion performs setting processing to set a grouping area GA used in determination processing in the identity determination portion. Based on the grouping area GA, the identity determination portion determines whether or not the solid object detected by a certain autonomous recognition sensor is identical to the solid object detected by an autonomous recognition sensor which is different from the certain autonomous recognition sensor.

3 Claims, 10 Drawing Sheets

16: LANE SHAPE/POSITION ESTIMATION PORTION
17: SOLID OBJECT FUSION PORTION
17a: LANE SLOPE ESTIMATION PORTION
17b: GROUPING AREA SET PORTION
17c: IDENTITY DETERMINATION PORTION

16: LANE SHAPE/POSITION ESTIMATION PORTION
17: SOLID OBJECT FUSION PORTION
17a: LANE SLOPE ESTIMATION PORTION
17b: GROUPING AREA SET PORTION
17c: IDENTITY DETERMINATION PORTION

16: LANE SHAPE/POSITION ESTIMATION PORTION
17: SOLID OBJECT FUSION PORTION
17a: LANE SLOPE ESTIMATION PORTION
17b: GROUPING AREA SET PORTION
17c: IDENTITY DETERMINATION PORTION
18: ROADSIDE OBJECT DETERMINATION PORTION

OBJECT RECOGNITION DEVICE

CROSS-REFERENCE TO RELATED APPLICATION

The present disclosure claims priority under 35 U.S.C. § 119 to Japanese Patent Applications No. 2017-225972, filed on Nov. 24, 2017. The contents of these applications are incorporated herein by reference in their entirety.

TECHNICAL FIELD

The present disclosure relates to an object recognition device.

BACKGROUND

JP 5812064 B discloses an object recognition device which is configured to determine whether or not a first object and a second object are the same object. The first object is detected by a millimeter wave radar. The second object is detected by an in-vehicle camera. When an area centered on the position of the first object and an area centered on the position of the second object are overlapped, it is determined that the two objects are the same object.

In the object recognition device described above, an error based on the characteristics of millimeter wave radar is taken into consideration in the area centered on the position of the first object. In addition, an error based on the characteristics of the in-vehicle camera is taken into consideration in the area centered on the position of the second object. However, since these regions are fixed in a relative direction of the detected objects, there is a possibility of erroneously determining that different objects detected in a curved lane are the same object.

Specifically, when a leading vehicle (i.e., the first object) traveling on a curved lane ahead of the vehicle equipped with the object recognition device and another leading vehicle (i.e., the second object) traveling on a curved lane next to the curved lane on which the first object travels are detected in the same relative direction, these vehicles may be erroneously determined to be the same object. The same is true when the leading vehicle (i.e., the first object) and a roadside object adjacent to the leading vehicle (i.e., the second object) such as a guard rail or a retaining wall are detected in the same relative direction. Therefore, it is desirable to improve for preventing an occurrence of such erroneous determination from occurring.

The present disclosure addresses the above described problem, and an object of the present disclosure is, to provide a technique capable of preventing an occurrence of an erroneous determination that different objects detected around a curved lane are the same object.

SUMMARY

A first aspect of the present disclosure is an object recognition device for solving the problem described above and has the following features.

The object recognition device comprises a first detection device, a second detection device and an object fusion portion.

The first detection device is configured to detect information on a first object around an own vehicle as first information.

The second detection device is configured to detect information on a second object around the own vehicle as second information.

The object fusion portion is configured to perform determination processing on whether or not the first object and the second object are the same object based on the first information and the second information.

The object recognition device further comprises a map database.

The map database contains information on lanes regarding shape and position of lanes.

The object fusion portion includes a lane slope angle estimation portion and a determination area set portion.

The lane slope angle estimation portion is configured to perform estimate processing of a slope angle of a lane to a travel direction of the own vehicle.

The determination area set portion is configured to perform setting processing of a determination area which is used for the determination processing.

The estimate processing is at least one of the following processing:

processing to estimate a first slope angle of the lane to the travel direction at the detecting position of the first object based on the information on lanes and the detecting position of the first object obtained from the first information; and processing to estimate a second slope angle of the lane to the travel direction at the detecting position of the second object based on the information on lanes and the detecting position of the second object obtained from the second information.

The setting processing is processing to set the determination area by rotating a first predetermined range including the detecting position of the first object and a second predetermined range including the detecting position of the second object.

When the first or second slope angle is estimated, the rotation angles of the first and second predetermined ranges are set to the same angle as the first slope angle or the second slope angle.

When the first and the second slope angles are estimated, the rotation angle of the first predetermined range is set to the same as the first slope angle while the rotation angle of the second predetermined rage is set to the same angle as the second slope angle.

A second aspect of the present disclosure has the following features according to the first aspect.

The map database further includes information on roadside objects.

The object recognition device further comprises a roadside object determining portion.

The roadside object determining portion is configured to determine whether or not a roadside object exists on a side strip adjacent to a lane on which the own vehicle travels, based on the position of the own vehicle and the information on roadside objects.

The determination area set portion is further configured to, when it is determined that the roadside object exists on the adjacent side strip, reduce each width of the first and second predetermined ranges on a side close to the adjacent side strip before rotating the first and second predetermined ranges in the setting processing.

A third aspect of the present disclosure has the following features according to the first aspect.

The first slope angle is an angle which is formed by a center line of the lane, obtained from the information on lanes, on which the own vehicle travels and a first tangent line of a first lane compartment line nearest to the detecting position of the first object. A tangent point of the first tangent line is a projection position at which distance from the detecting position of the first object is shortest when the same detecting position is projected onto the first lane compartment line.

The second slope angle is an angle which is formed by the center line of the lane and a second tangent line of a second lane compartment line nearest to the detecting position of the second object. A tangent point of the second tangent line is a projection position at which distance from the detecting position of the second object is shortest when the same detecting position is projected onto the second lane compartment line.

According to the first aspect, the first and second predetermined ranges are rotated based on the first or second slope angle in the setting processing performed by the determination area set portion. The first slope angle is a slope angle of the lane to the travel direction at the detecting position of the first object. The second slope angle is a slope angle of the lane to the travel direction at the detecting position of the second object. Thus, when the first and second predetermined ranges are rotated based on the first or second slope angle, it is suppressed, if the detecting positions of the first and second objects exist around the curved lane, that the rotated first or second predetermined range is set outside the travel lane of the own vehicle. Therefore, it is possible to prevent an occurrence of an erroneous determination that the first and second objects detected around the curved lane are the same object.

According to the second aspect, if it is determined that the roadside object exists on the adjacent side strip, each width of the first and second predetermined ranges on the side close to the adjacent side strip is reduced before rotating the first and second predetermined ranges. Therefore, it is possible to prevent the roadside object existing on the side strip adjacent to the curved lane from being erroneously determined to be as the same object as the first object or the second object around the curved lane.

According to the third aspect, it is possible to set the first and second slope angles appropriately. Therefore, it is possible to prevent the occurrence of the erroneous determination that the first and second objects around the curved lane are the same object.

DESCRIPTION OF EMBODIMENTS

Figure 1:
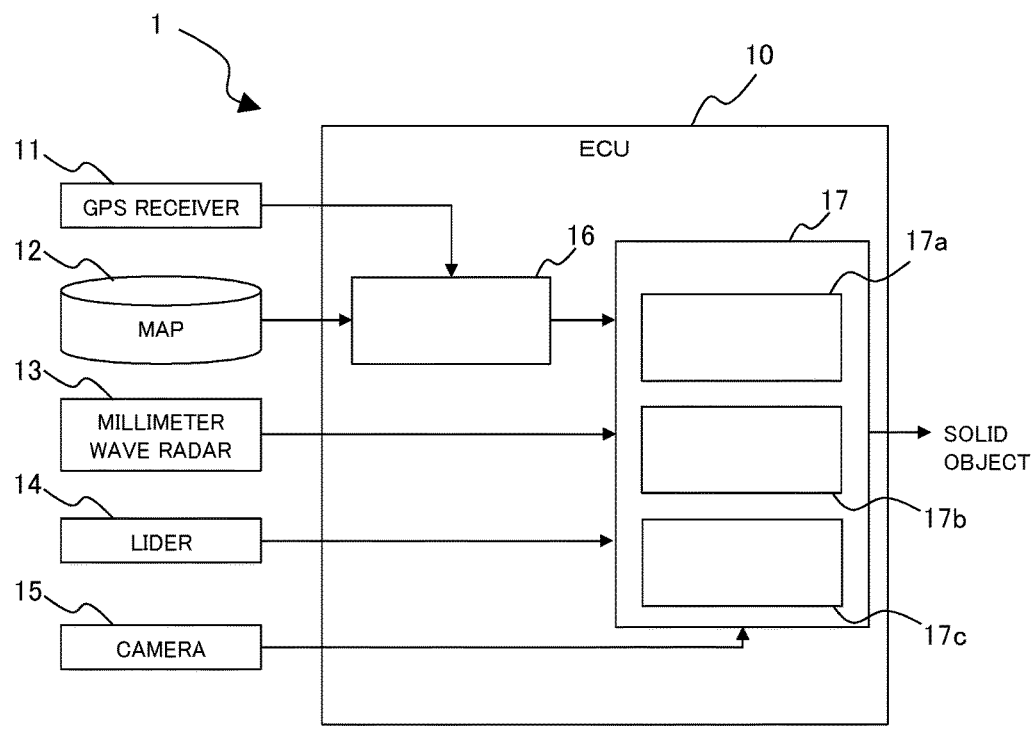
FIG. 1 is a block diagram for showing a configuration of an object recognition device according to a first embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

A first embodiment of the present disclosure will be described with reference to FIGS. 1 to 8.

1. Configuration of Object Recognition Device

FIG. 1 is a block diagram for describing a configuration of an object recognition device according to the first embodiment. The object recognition device 1 shown in FIG. 1 is mounted on a vehicle and is configured to recognize a solid object existing in front, side or rear of the vehicle. The solid object as a recognition object is a fixed object such as moving objects such as walker, bicycle, vehicle, and street plant, telephone pole, building, road structure, etc. The road structure include a structure installed on a side strip such as a guard rail, a road sign, a retaining wall, soundproof wall (hereinafter also referred to as a "roadside object"). In this specification, a vehicle equipped with this object recognition device 1 is also referred to as an "own vehicle OV".

As shown in FIG. 1, the object recognition device 1 includes a global positioning system (GPS) receiver 11, a map database 12, a millimeter wave radar 13, a LIDAR (i.e., Laser Imaging Detection and Ranging) 14, a camera 15 and an electric control unit (ECU) 10. The number of each of the millimeter wave radar 13, the LIDER 14 and the camera 15 is at least one. The millimeter wave radar 13, the LIDER 14 and the camera 15 are generically called "autonomous recognition sensors". Hereinafter, when referring to the millimeter wave radar 13, the LIDER 14 or the camera 15, it is also referred to as an "autonomous recognition sensor".

The GPS receiver 11 measures actual location of the own vehicle OV (e.g., latitude and longitude of the own vehicle OV) by receiving signals from three or more GPS satellites. The GPS receiver 11 transmits information on the actual location of the own vehicle OV to the ECU 10.

The map database 12 is a database in which high-precision map information is stored. The map database 12 is formed in, for example, a hard disk drive (HDD) mounted in the own vehicle OV. The high-precision map information includes, for example, positional information (e.g., latitude and longitude) of a compartment line that partitions two lanes (hereinafter also referred to as a "lane compartment line"), shape information on lanes (e.g., classification such as curved lane and straight lane, and curvature of curved lane, etc.) and positional information on intersections and branch points. The high-precision map information also includes information on positional information (e.g., latitude and longitude) and style information (e.g., height, width and depth) of fixed objects.

The millimeter wave radar 13 launches millimeter wave (an example of electromagnetic wave) around the own vehicle OV and detects the solid object by receiving reflective wave reflected by the solid object. According to millimeter wave radar 13, it is possible to estimate relative speed of the solid object to the own vehicle OV based on time interval between launching millimeter wave and receiving reflected wave. According to millimeter wave radar 13, it is also possible to estimate relative position of the solid object to the own vehicle OV based on direction in which the reflective wave goes to the own vehicle OV. The millimeter wave radar 13 transmits relative quantity composing of the relative speed and the relative position to the ECU 10 as solid object information.

The LIDER 14 detects the solid object by irradiating a laser emitting pulses around the own vehicle OV and receiving reflected laser light from the solid object. Likewise the millimeter wave radar 13, according to the LIDER 14, it is possible to estimate the relative speed and the relative position (i.e., the relative quantity) of the solid object relative to the own vehicle OV. In addition to, according to the LIDER 14, it is possible to recognize outer shape of the solid object (e.g., height and width). The LIDER 14 transmits the relative quantity and the outer shape of the solid object to the ECU 10 as solid object information.

The camera 15 captures an external situation of the own vehicle OV. The camera 15 is provided, for example, on a back side of a windshield of the own vehicle OV. The camera 15 may be a monocular camera or a stereo camera. The stereo camera has, for example, two imaging portions arranged to reproduce binocular parallax. The shooting information of the stereo camera includes information on depth direction. The camera 15 transmits the shooting information to the ECU 10. When this shooting information is analyzed in the ECU 10, it is possible to obtain solid object information on the relative quantity of the solid object and the outer shape of the solid object. The shooting information may be analyzed in the camera 15 and the solid object information may be transmitted to the ECU 10.

The ECU 10 is a control unit having a central processing unit (CPU), a read only memory (ROM), a random access memory (RAM), a controller area network (CAN) communication device, etc. In the ECU 10, for example, program stored in the ROM is loaded into the RAM, and the program loaded in the RAM is executed by the CPU to realize various functions. The ECU 10 may be composed of a plurality of electronic control units.

2. Configuration of ECU 10

Next, a functional configuration of the ECU 10 will be described. The ECU 10 has a function to recognize an object existing around the own vehicle OV. This function is realized by a lane shape/position estimation portion 16 and a solid object fusion portion 17 of the ECU 10. The portions 16 and 17 do not exist as hardware in the ECU 10, but are realized as software when the program stored in the ROM is executed by the CPU.

Figure 2:
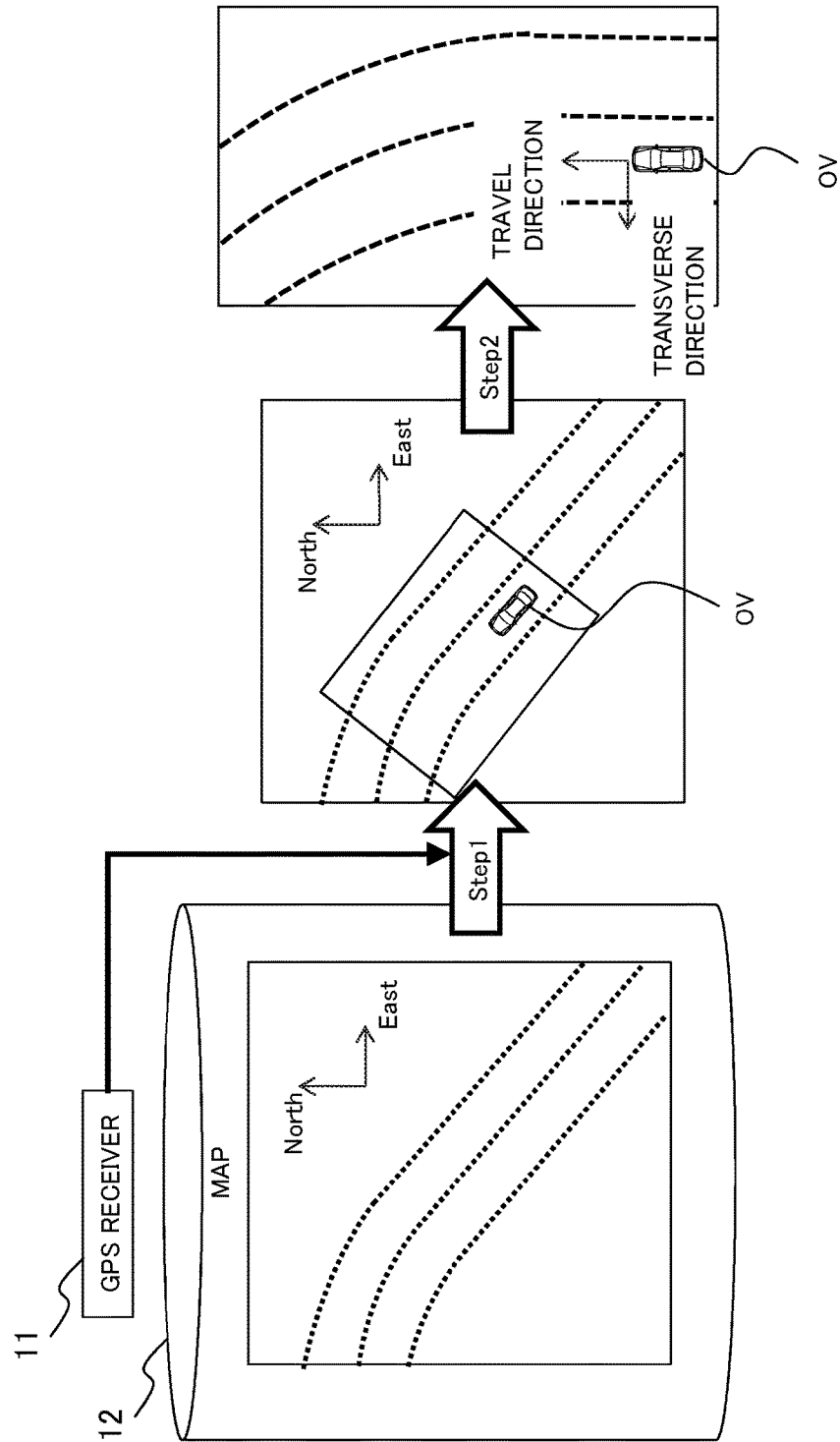
FIG. 2 is a diagram for describing an example of estimate processing by a lane shape/position estimation portion.

The portion 16 performs estimate processing to estimate shape and position of lanes around the own vehicle OV. In order to reduce the processing load, this estimate processing may estimate only the shape and position of a lane on which the own vehicle OV travels (hereinafter also referred to as an "own lane"). FIG. 2 is a diagram for describing an example of estimate processing by the portion 16. The estimate processing shown in FIG. 2, first, the positional information on the lane compartment line around the own vehicle OV is read from the map database 12 based on the information on the actual location from the GPS receiver 11. Then, this positional information is transformed into a rectangular plane coordinate system (Step 1). Subsequently, this rectangular plane coordinate system is converted into a reference frame whose origin is a reference point of the own vehicle OV (Step 2). The y-axis of this reference frame corresponds to a travel direction of the own vehicle OV (a vehicle's length direction) and the x-axis corresponds to a transverse direction (a vehicle's width direction) of the own vehicle OV. The method for estimating the shape and position of the lane applicable to the present disclosure is not particularly limited. That is, the shape and position of the lane may be estimated by a known method.

The portion 17 performs fusion processing of the solid object separately detected by the millimeter wave radar 13, the LIDER 14 and the camera 15. From the millimeter wave radar 13 and the LIDER 14 to the portion 17, information on a plurality of solid objects existing around the own vehicle OV is continuously transmitted. In the portion 17, information created based on analysis of shooting information from the camera 15 is also continuously transmitted. In the fusion processing, based on these solid object information, it is determined whether or not the solid object detected by a certain autonomous recognition sensor (e.g., the millimeter wave radar 13) is identical to the solid object detected by the autonomous recognition sensor which is different from the certain autonomous recognition sensor (e.g., the LIDER 14). When the same type of the autonomous recognition sensors (e.g., three millimeter wave radars 13) are mounted at different positions of the own vehicle OV (e.g., front left, front middle and front right of the own vehicle OV), it is judged in this determination processing that whether or not the solid objects detected by these autonomous recognition sensors are identical.

The portion 17 includes a lane slope estimation portion 17a, a grouping area set portion 17b, and an identity determination portion 17c as functions for realizing the fusion processing. The portion 17a performs estimate processing to estimate a slope angle of lane θ at the detecting position of the solid object detected by the autonomous recognition sensor. The portion 17b performs setting processing to set a grouping area GA to be used in the determination processing by the portion 17c. Based on the grouping area GA, the portion 17c determines whether or not the solid object detected by the certain autonomous recognition sensor is identical to the solid object detected by the autonomous recognition sensor which is different from the certain autonomous recognition sensor.

Figure 3:
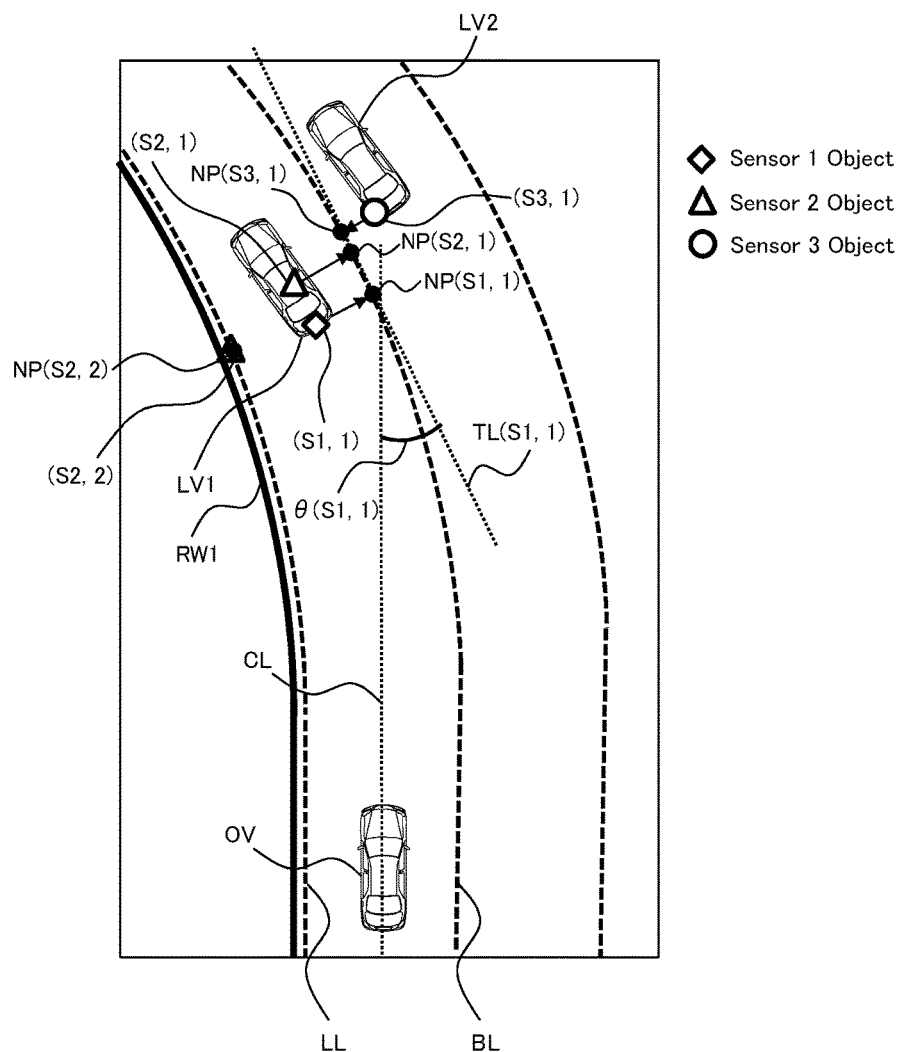
FIG. 3 is a diagram for describing an example of estimate processing by a lane slope estimation portion.

FIG. 3 is a diagram for describing an example of the estimate processing by the portion 17a. For the sake of convenience of explanation, a leading vehicle LV1 existing on the own lane, a leading vehicle LV2 existing on a lane adjacent to the own lane (hereinafter also referred to as an "adjacent lane"), and a retaining wall RW1 located in the leftward direction of the own lane are drawn as the solid objects within the reference frame shown in FIG. 3. Moreover, it is assumed that the solid object information of the leading vehicle LV1 is detected by a "Sensor 1". Also, the solid object information of the leading vehicle LV1 and the retaining wall RW1 is detected by a "Sensor 2". Also, the solid object information of the leading vehicle LV2 is detected by a "Sensor 3". The "Sensor 1", the "Sensor 2" and the "Sensor 3" correspond to any one of the autonomous recognition sensors.

In the estimate processing by the portion 17a, first, the lane compartment line nearest to the detecting position of the solid object in the reference frame (hereinafter also referred to as a "nearest compartment line") is specified. For example, the nearest compartment line of the detecting position (S1, 1) based on the solid object information from the "Sensor 1" corresponds to a line that separates the own lane and the adjacent lane (i.e., a borderline BL). This borderline BL also corresponds to both the nearest compartment line of the detecting position (S2, 1) based on the solid object information from the "Sensor 2" and the nearest compartment line of the detecting position (S3, 1) based on the solid object information from the "Sensor 3". The nearest compartment line of the detecting position (S2, 2) based on the solid object information from the "Sensor 2" corresponds to a line which demarcates the own lane and the side strip (i.e., a leftward line LL). Note that the additional character "x" in the detecting position (Sx, y) represents number of the autonomous recognition sensor (NB, x=1 to 3) and the symbol "y" represents the serial number of the solid objects detected by the same autonomous recognition sensor.

In the estimate processing by the portion 17a, a nearest projection position is subsequently specified. The "nearest projection position" refers to a position on the nearest compartment line where distance from the detecting position of the solid object is the shortest when the same detecting position is projected onto the nearest compartment line. For example, the nearest projection position of the detecting position (S1, 1) corresponds to a nearest point NP (S1, 1) on the borderline BL. The nearest projection positions of the detecting position (S2, 1) and the detecting position (S3, 1) are also on the borderline BL. Specifically, the nearest projection position of the detecting position (S2, 1) corresponds to a nearest point NP (S2, 1) and that of the detecting position (S3, 1) corresponds to a nearest point NP (S3, 1). The nearest projection position of the detecting position (S2, 2) corresponds to a nearest point NP (S2, 2) on the leftward line LL.

In the estimate processing by the portion 17a, subsequently, an angle $\theta$ formed by the tangent line at the nearest projection position and a center line CL of the own lane is calculated. The center line CL is specified as a line passing through the center of the lane compartment line which was read at the estimate processing by the portion 16. An angle $\theta$ (S1, 1) between the center line CL and a tangent line TL (S1, 1) at the nearest point NP (S1, 1) on the borderline BL corresponds to a lane slope angle $\theta$ at the detecting position (S1, 1). An angle $\theta$ at the other detecting positions than the detecting position (S1, 1) are calculated in the same way as the lane slope angle $\theta$ at the detecting position (S1, 1). In order to reduce the processing load, in this estimate processing, a representative lane slope angle $\theta r$ at a representative detecting position (e.g., the detecting position (S1, 1)) may be calculated while the calculation of the angle $\theta$ at the other detecting positions than the representative detecting position may omitted.

Figure 4:
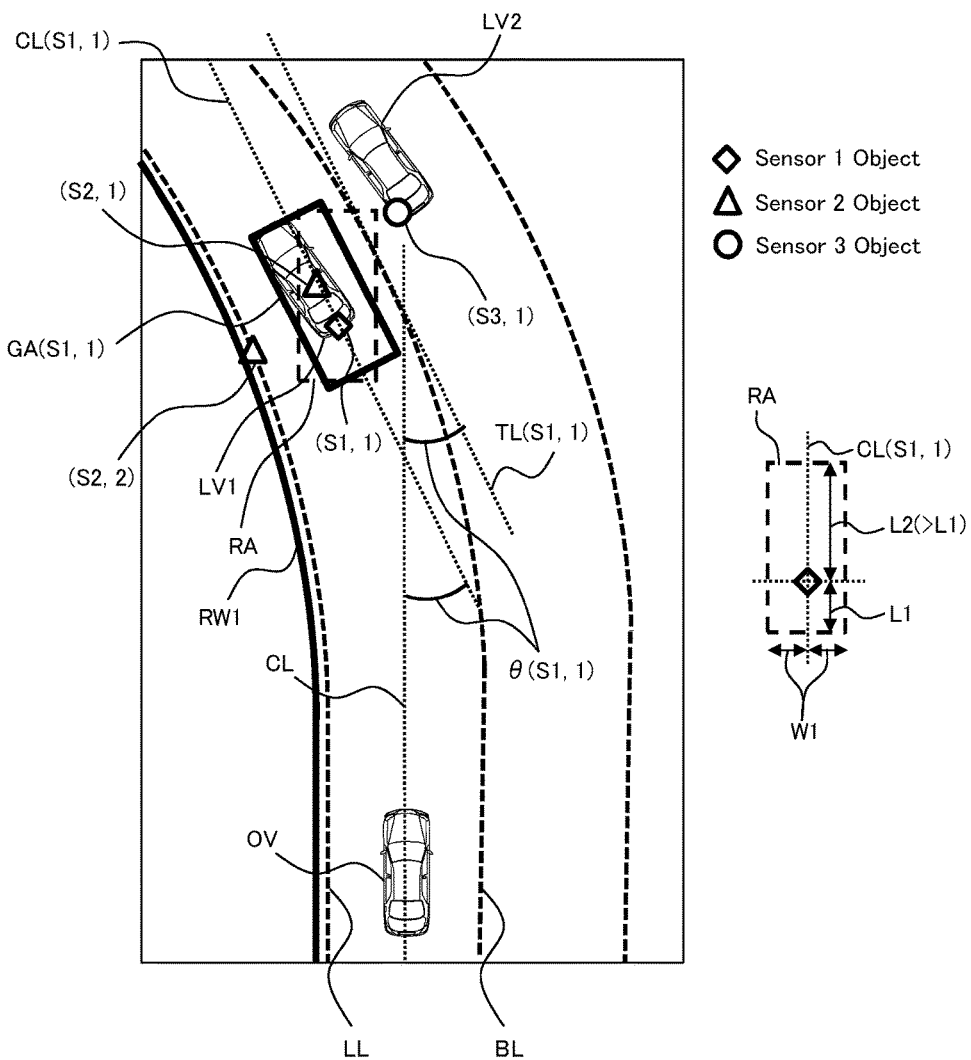
FIG. 4 is a diagram for describing an example of setting processing by a grouping area set portion.

FIG. 4 is a diagram for describing an example of the setting processing of the grouping area GA by the portion 17b. For the sake of convenience of explanation, among the lane slope angle $\theta$ at each detecting position of the solid objects, only the lane slope angle $\theta$ (S1, 1) at the detecting position (S1, 1) is drawn in the reference frame shown in FIG. 4. The grouping area GA (S1, 1) shown in this figure is a predetermined area whose center approximately coincides with the detecting position (S1, 1).

In FIG. 4, a rectangle area RA having a transverse direction width of W1+W1 and a longitudinal direction width of L1+L2 is drawn. A longitudinal direction of the rectangle area RA is consistent with the travel direction of the own vehicle OV. In the setting processing of the grouping area GAs, such the rectangle area RA is rotated by the lane slope angle $\theta$ (S1, 1) around the detecting position (S1, 1) as its rotating center. The area after the rotation of the rectangle area RA by the lane slope angle $\theta$ (S1, 1) is the grouping area GA (S1, 1) corresponding to the detecting position (S1, 1). Similar to the grouping area GA (S1, 1), in the setting processing of the grouping area GA, the other grouping area GAs corresponding to other detecting position GAs are rotated by the lane slope angle $\theta$ at each of the detecting positions. When only the representative slope angle $\theta r$ is calculated, the grouping area GA corresponding to the other detecting position is rotated by the same slope angle $\theta r$ around the same detecting position.

The rectangle area RA may have pre-set widths of error in the transverse and travel directions according to characteristics of the autonomous recognition sensor. Also, in the setting processing of the grouping area GA, an oval area, a trapezoid area or a polygon area may be set instead of the rectangle area RA.

Figure 5:
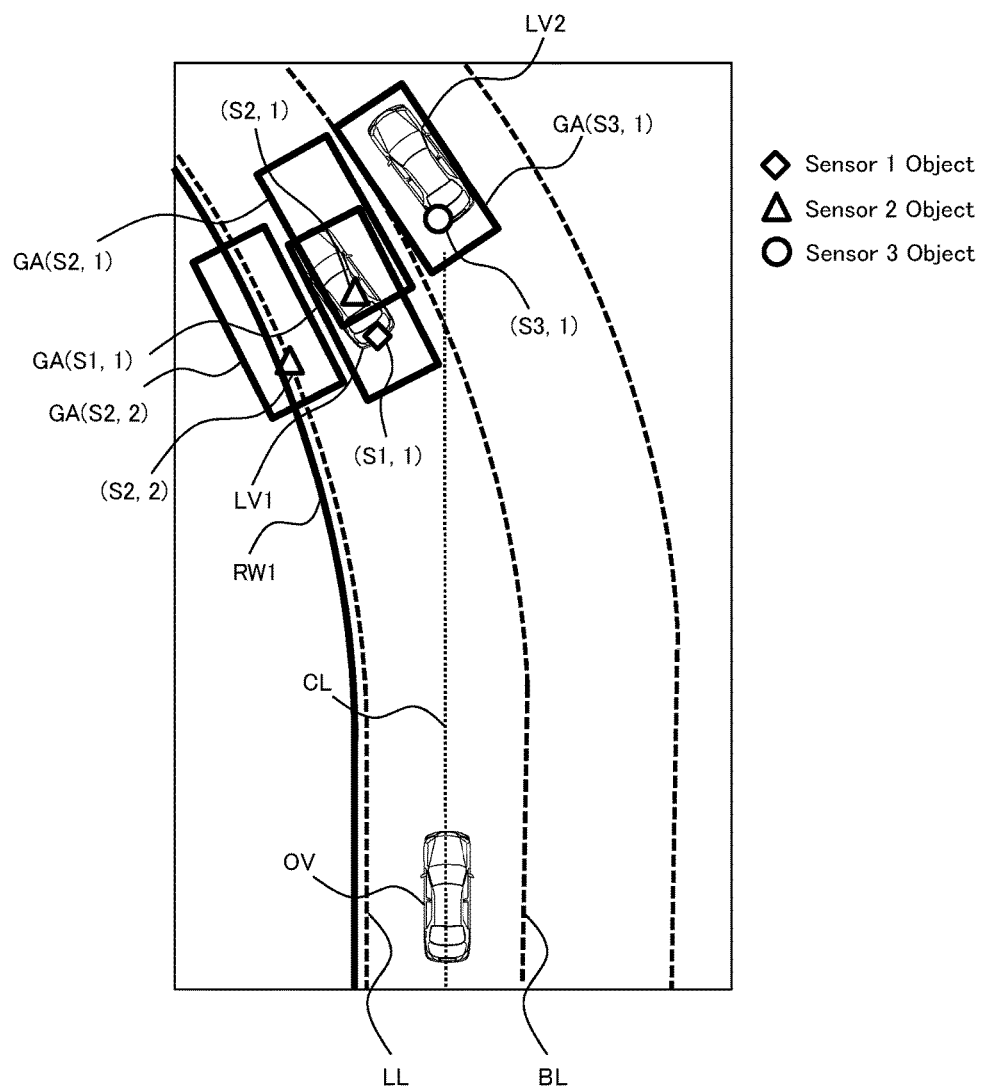
FIG. 5 is a diagram for describing an example of determination processing by an identity determination portion.

FIG. 5 is a diagram for describing an example of the determination processing by the portion 17c. Points GA (S1, 1), GA (S2, 1), GA (S2, 2) and GA (S3, 1) shown in FIG. 5 are the grouping area GAs corresponding to each detecting position of the solid objects. In the determination processing by the portion 17c, when there is an overlapping area between two different grouping area GAs, it is determined that the solid objects detected by two different autonomous recognition sensors are identical. In FIG. 5, the overlapping area is formed between the grouping area GA (S1, 1) and the grouping area GA (S2, 1). Therefore, in the determination processing by the portion 17c, it is determined that the solid object of the detecting position (S1, 1) is identical to the solid object of the detecting position (S2, 1).

On the other hand, the grouping area GA (S2, 2) has no overlapping area with the other grouping area GAs. Therefore, in the determination processing by the portion 17c, it is determined that there is no solid object identical to the solid object of the detecting position (S2, 2). Also, in the grouping area GA (S3, 1), there is no overlapping area with the other grouping area GAs. Therefore, in the determination processing by the portion 17c, it is determined that there is no solid object identical to the solid object of the detecting position (S3, 1).

In the fusion processing by the portion 17, the relative quantities of the solid objects which were determined to be the same object in the determination processing by the portion 17c are integrated. The method for integrating the relative quantity applicable to the present disclosure is not particularly limited. That is, the relative quantity may be integrated by a known method. For example, it may be integrated by obtaining the average value of the relative quantity. It may be integrated by weighting according to the characteristics of the autonomous recognition sensor. It may be integrated by a stochastic estimation method using a Kalman filter or the like.

3. Effects of Object Recognition Device According to First Embodiment

Figure 6:
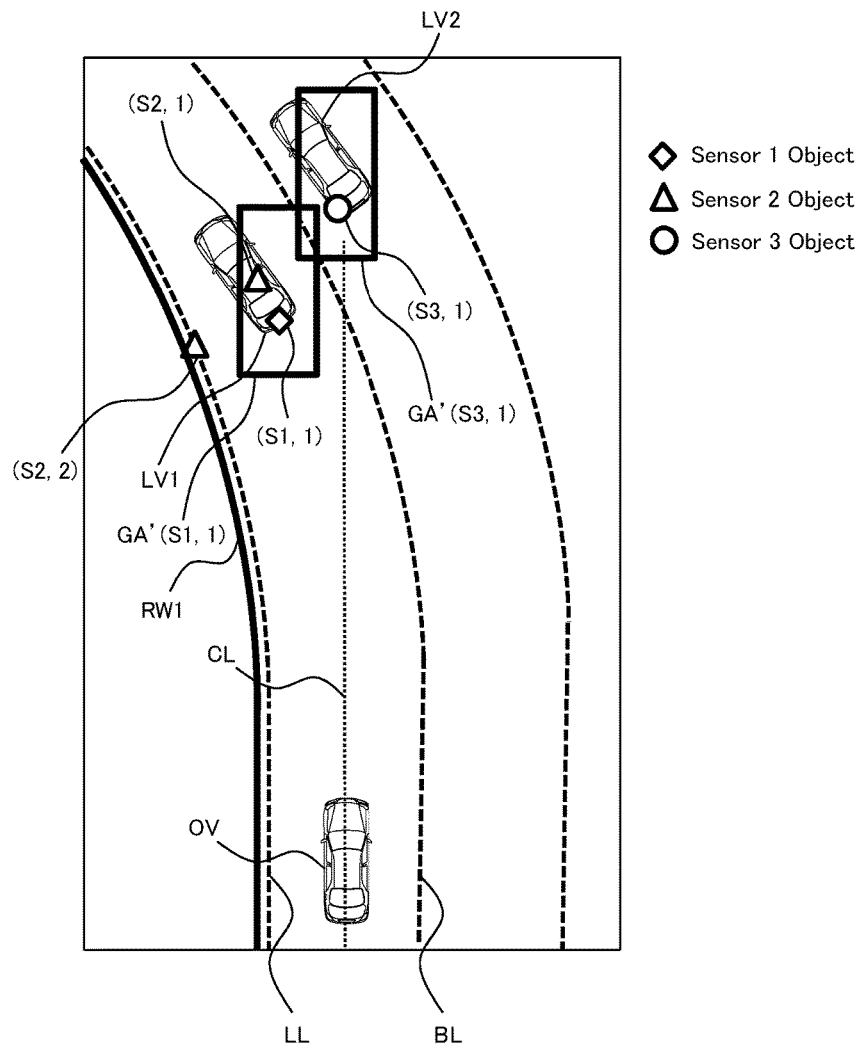
FIG. 6 is a diagram for describing a first effect of the object recognition device according to the first embodiment.

The effects of the object recognition device according to the first embodiment will be described with reference to FIGS. 6 to 8. FIG. 6 is a diagram for describing a problem when the grouping area GAs are set, after the estimate processing of the shape and position of the lane, without the estimate processing by the portion 17a. When the estimate processing by the portion 17a is not performed, the rectangle area RA described in FIG. 4 is set directly to each detecting position of the solid objects. Thus, the longitudinal direction of the grouping area GAs coincide with the travel direction of the own vehicle OV. In FIG. 6, the grouping area GA' (S1, 1) corresponds to a rectangle area RA whose center approximately coincides with the detecting position (S1, 1). Also, the grouping area GA' (S3, 1) corresponds to a rectangle area RA whose center approximately coincides with the detecting position (S3, 1). Both of the longitudinal direction of grouping area GA' (S1, 1) and GA' (S3, 1) are coincide with travel direction of the own vehicle OV.

As shown in FIG. 6, there is an overlapping area between the grouping area GA' (S1, 1) and the grouping area GA' (S3, 1). For this reason, it is determined in the determination processing by the portion 17c that the solid object at the detecting position (S1, 1) is identical to the solid object at the detecting position (S3, 1). However, in fact, the solid object of the positioning position (S1, 1) (i.e., the leading vehicle LV1) is not identical to the solid object of the detecting position (S3, 1) (i.e., the leading vehicle LV2). In other words, an error occurs in the determination processing by the portion 17c.

In this respect, in the object recognition device according to the first embodiment, the lane slope angle θ is estimated in the estimate processing by the portion 17a (q.v., FIG. 3). Moreover, in the setting processing of the grouping area GAs, the rectangle area RAs for each detecting position of the solid objects are rotated in accordance with the lane slope angle θ (see FIGS. 4 and 5). Therefore, it is possible to prevent an occurrence of the error in the determination processing described in FIG. 6.

Figure 7:
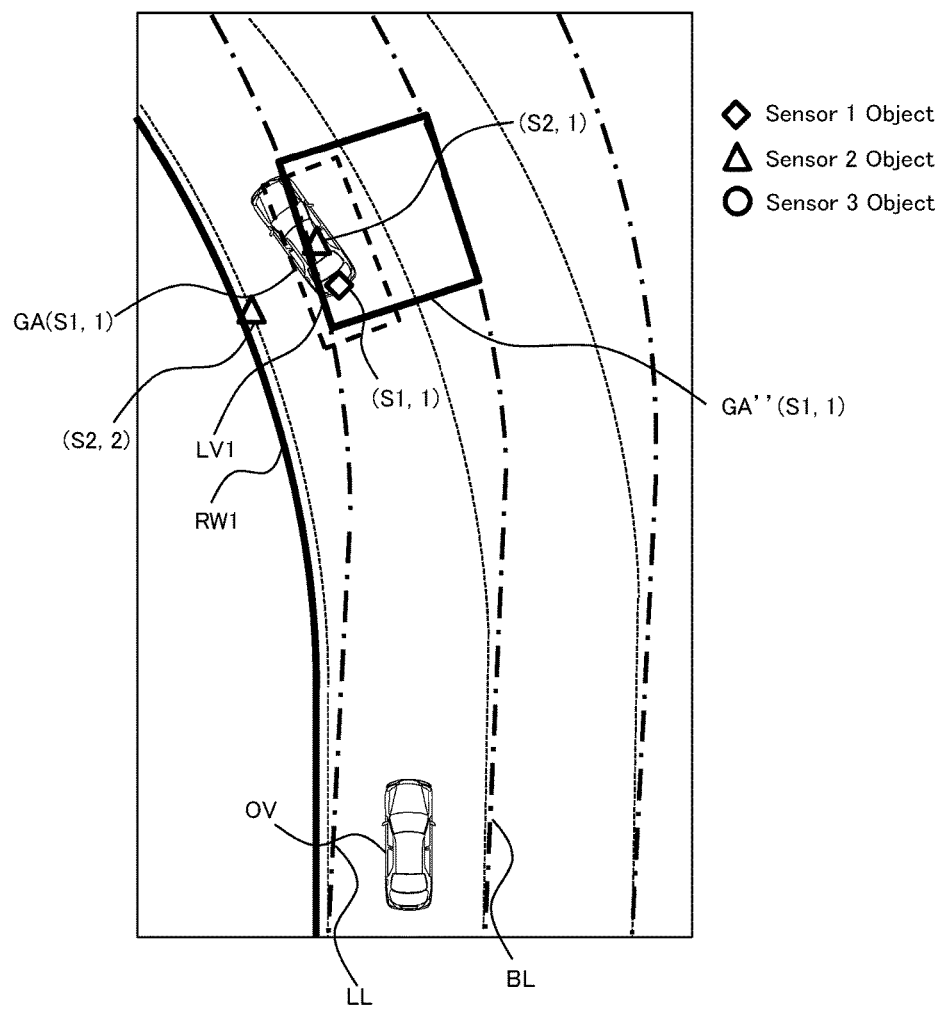
FIG. 7 is a diagram for describing a second effect of the object recognition device according to the first embodiment.

FIG. 7 is a diagram for describing another problem when the grouping area GAs are set, after estimate processing by the portion 16, with reference to the estimated position and the estimated shape of the own lane. When the grouping area GAs are set with reference to the estimated position and the estimated shape of the own lane, it is possible to consider directions of the lane at each detecting position of the solid objects. However, if there is a difference between the actual position of the lane with a broken line and the estimated position of the lane indicated with an alternate long and short dashed line, the position of the grouping area GA move away from the detecting position of the solid object.

The grouping area GA" (S1, 1) shown in FIG. 7 is an area set based on the estimated shape of the own lane in the detecting position (S1, 1). As shown in FIG. 7, there is a gap between a center position of the grouping area GA" (S1, 1) and the detecting position (S1, 1). Therefore, if the difference between the estimated position of the own lane and an actual position thereof is large, this gap becomes large. Then, the detecting position (S1, 1) deviates from the grouping area GA" (S1, 1). Then, if the detecting position (S1, 1) is out of the grouping area GA" (S1, 1), the solid object of the detecting position (S1, 1) is treated as the solid object outside the own lane.

In this respect, in the object recognition device of the first embodiment, by rotating the rectangle area RA by the lane slope angle θ around the detecting position of the solid object the grouping area GA corresponding to the same detecting position is set. Therefore, even when the difference between the estimated position of the own lane and the actual position thereof is large, the grouping area GAs are set around the detecting position as the rotating center. Specifically, the grouping area GA (S1, 1) indicated by the broken line in FIG. 7 is set with the detecting position (S1, 1) as the center thereof. Therefore, it is possible to prevent an occurrence of the gap between the detecting position (S1, 1) and the center position of the grouping area GA (S1, 1).

Figure 8:
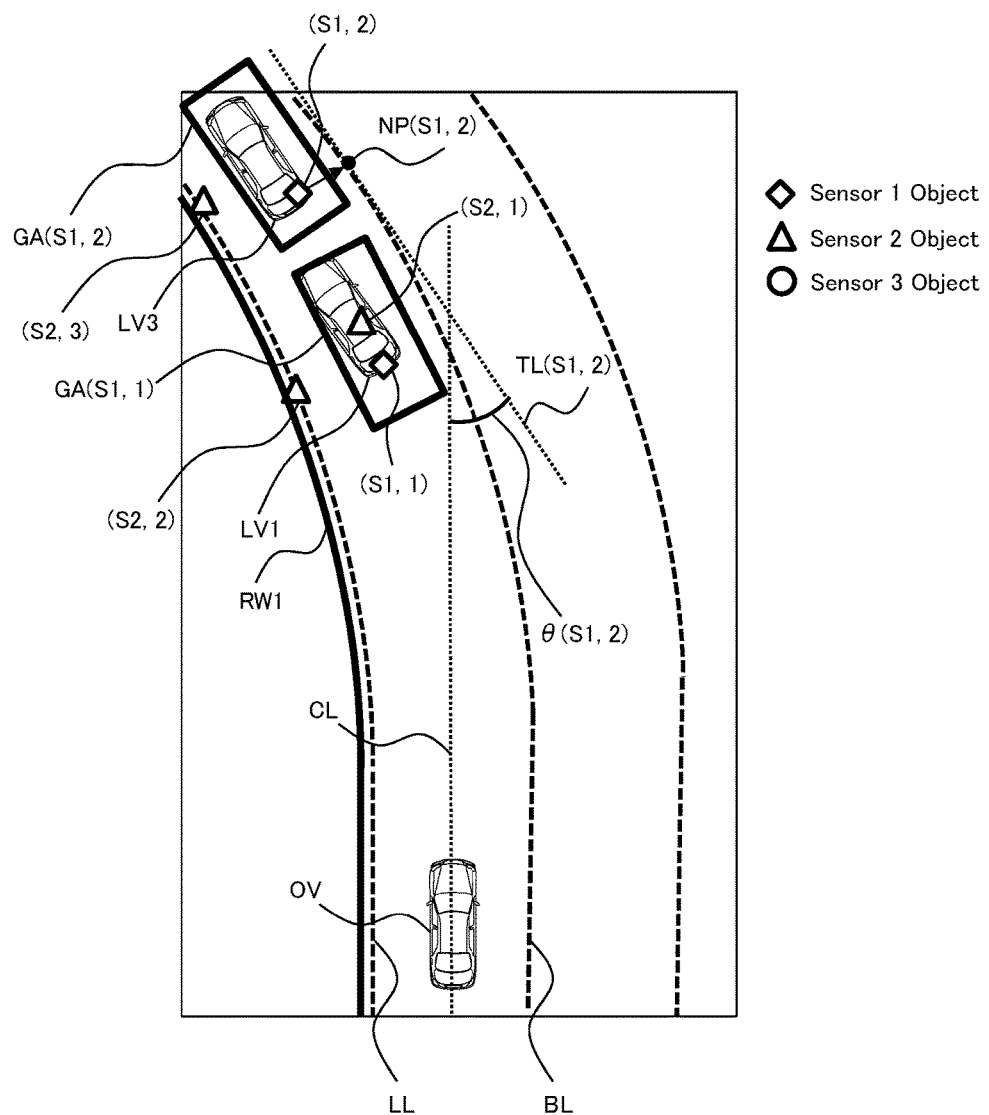
FIG. 8 is a diagram for describing a third effect by the object recognition device according to the first embodiment.

FIG. 8 is a diagram for describing a third effect by the object recognition device according to the first embodiment. For convenience of explanation, in the reference frame of FIG. 8, a leading vehicle LV3 traveling in front of the leading vehicle LV1 is drawn as the solid object. In FIG. 8, the solid object information of the leading vehicles LV1 and LV3 is detected by the "Sensor 1". Also, the solid object information of the leading vehicle LV1 and the retaining wall RW1 is detected by the "Sensor 2".

The "Sensor 1" and "Sensor 2" shown in FIG. 8 are the millimeter wave radar 13 or the LIDER 14. According to the millimeter wave radar 13 or the LIDER 14, because of the reflection of millimeter wave or light, it is possible to obtain the solid object information of the leading vehicle LV3 even when the leading vehicle LV3 is unable to grasp directly by the camera 15.

In the object recognition device according to the first embodiment, the estimate processing by the portion 16 is performed based on the map database 12. Therefore, compared to an estimation based on the solid object information from the LIDER 14 or the shooting information from the camera 15, it is possible to improve precision of the estimation on the shape and position of the lanes around the own vehicle OV. If the precision of the estimation on the shape and position of the lanes around the own vehicle OV is improved, it is possible to prevent an occurrence of an erroneous determination that two different objects traveling on different lanes are the same object.

Moreover, in the object recognition device according to the first embodiment, once the solid object information from the radar 13 or the LIDER 14 is obtained after the estimate processing by the portion 16, the grouping area GA is set by the processing by the portions 17a and 17b. Specifically, by performing the estimate processing by the portion 17a, a nearest point NP (S1, 2) on the borderline BL shown in FIG. 8 is specified as the nearest projection position of a detecting position (S1, 2). In addition, an angle θ (S1, 2) which is formed by a tangent line TL (S1, 2) at a nearest point NP (S1, 2) on the borderline BL and the center line CL is calculated as the lane slope angle θ at the detecting position (S1, 2). And by performing the setting processing of the grouping area GA by the portion 17b, the grouping area GA whose center approximately coincides with the detecting position (S1, 1) is set. Therefore, it is possible to perform the fusion processing of the solid object at the detecting position (S1, 2) (i.e., the leading vehicle LP3).

In the first embodiment described above, two different types of the autonomous recognition sensors or two autonomous recognition sensors of the same type correspond to the "first detection device" and the "second detection device" of the first aspect. Further, information transmitted from the autonomous recognition sensors to the ECU 10 (more specifically, the solid object information from the millimeter wave radar 13 or the LIDER 14 or the shooting information from the camera 15) correspond to the "first information" or the "second information" of the first aspect. Further, the portion 17 corresponds to the "object fusion portion" of the first aspect. Further, the portion 17b corresponds to the "determination area set portion" of the first aspect. Further, the rectangle area RAs correspond to the "first predetermined range" and the "second predetermined range" of the first aspect (NB, in a case of modifying the pre-set widths of error according to characteristics of the autonomous recognition sensor, the modified rectangle area RAs correspond to the "first predetermined range" and the "second predetermined range" of the first aspect). Further, the grouping area GA corresponds to the "determination area" of the first aspect.

Further, the tangent line TL (S1, 1) or TL (S2, 1) corresponds to the "first tangent line" or the "second tangent line" of the third aspect. Further, the borderline BL corresponds to the "first lane compartment line" and the "second lane compartment line" of the third aspect. Further, the nearest point NP (S1, 1), NP (S2, 1) or NP (S3, 1) corresponds to the "tangent point" of the first or second tangent line of the third aspect.

Second Embodiment

A second embodiment of the present disclosure will be described with reference to FIGS. 9 to 10.

1. Configuration of Object Recognition Device

Figure 9:
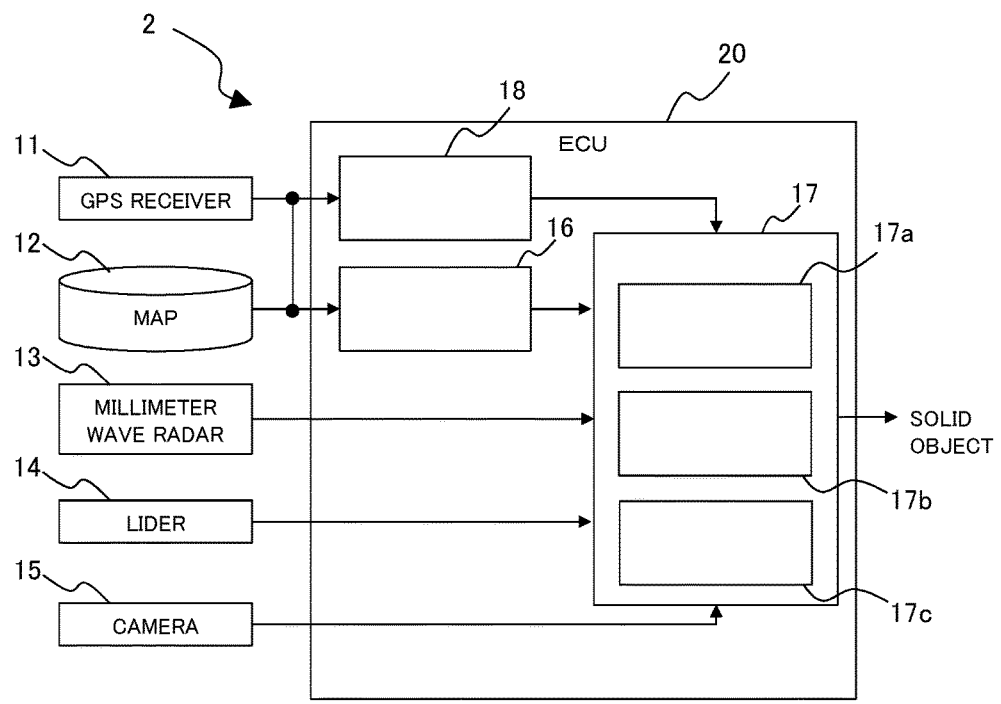
FIG. 9 is a block diagram for showing a configuration of an object recognition device according to a second embodiment of the present disclosure.

FIG. 9 is a block diagram for describing a configuration of an object recognition device according to the second embodiment. The configuration of the object recognition device 2 shown in FIG. 9 is basically common to the configuration of the object recognition device 1 shown in FIG. 1. Therefore, description for the common configuration will be omitted. In this specification, like the vehicle equipped with the object recognition device 1 shown in FIG. 1, a vehicle equipped with the object recognition device 2 shown in FIG. 9 is also referred to as an "own vehicle OV".

Unlike the object recognition device 1 shown in FIG. 1, the object recognition device 2 shown in FIG. 9 includes a roadside object determination portion 18. The portion 18 is a configuration for realizing a function of the ECU 20 to recognize an object existing around the own vehicle OV. The portion 18 does not exist as hardware in the ECU 20, but is realized as software when the program stored in the ROM is executed by the CPU.

The portion 18 performs determination processing to determine whether or not the roadside object exists in the side strip adjacent to the own lane (hereinafter also referred to as an "adjacent side strip"). In the determination processing by the portion 18, first, the positional information on the road structure around the own vehicle OV are read from the map database 12 based on the information on the actual location from the GPS receiver 11. Subsequently, based on the positional information on the road structure, it is determined whether or not the roadside object exists in the adjacent side strip. A determination range to determine the existence of the roadside object is set to a predetermined distance ahead of the own vehicle OV. However, this predetermined distance may be extended or shortened according to traveling speed of the own vehicle OV and the characteristics of autonomous recognition sensors.

If it is determined that the roadside object exists on the adjacent side strip, the portion 17b sets the grouping area GA while reducing the size of the rectangle area RA. FIG. 10 is a diagram for describing an example of the setting processing of the grouping area GA by the portion 17b. For convenience of explanation, only the grouping area GA (S1, 1) corresponding to the detecting position (S1, 1) is shown in the reference frame of FIG. 10.

Figure 10:
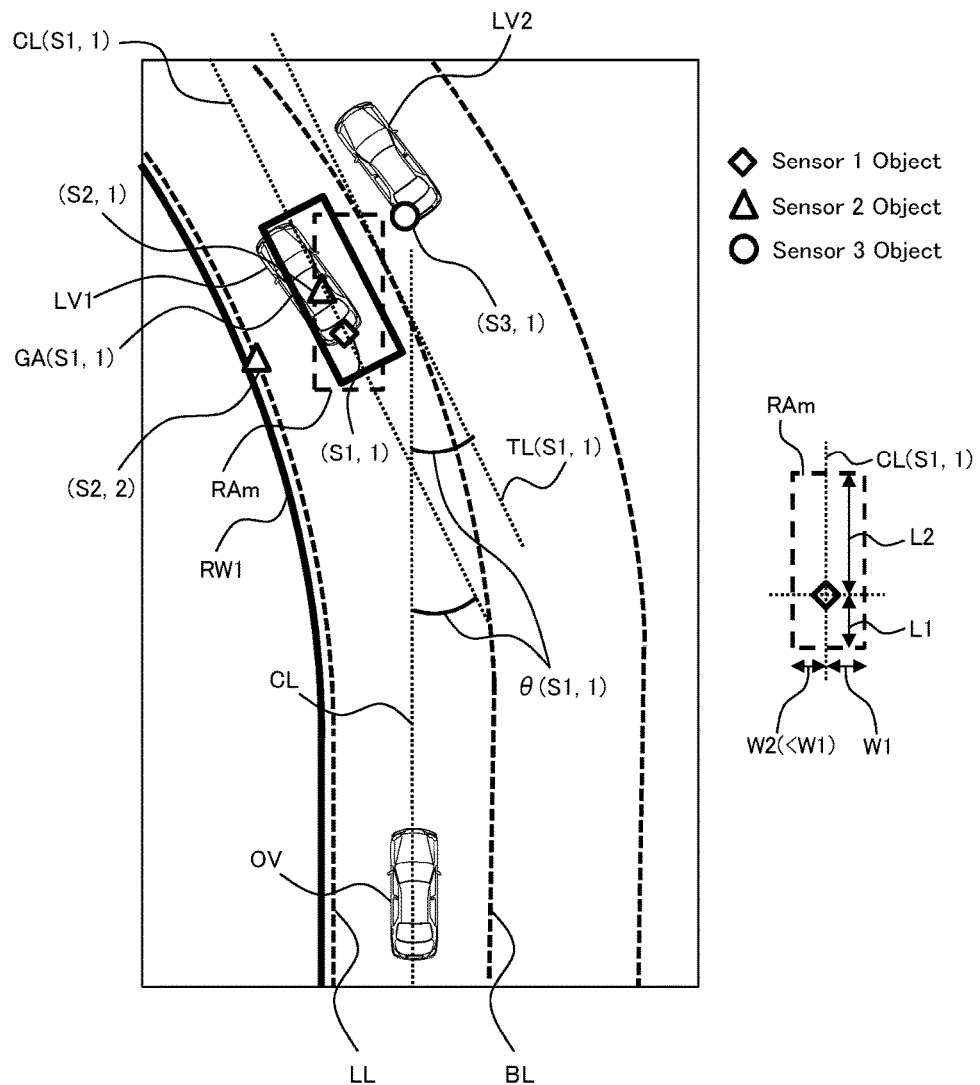
FIG. 10 is a diagram for describing an example of setting processing of a grouping area GA by a grouping area set portion.

In the example shown in FIG. 10, it is determined that there is the roadside object on the left side of the own lane (i.e., the retaining wall RW1). Therefore, in the setting processing of the grouping area GA, a rectangle area RAm having the transverse direction width of W1+W2 and the longitudinal direction width of L1+L2 is set. Compared with the rectangle area RA shown in FIG. 4, the width W2 of the rectangle area RAm in the leftward direction is narrower than the width W1 in the rightward direction. The reason for this is that the width in the direction where the roadside object was determined to exist (i.e., the leftward direction) is reduced. In the setting processing, such the rectangle area RAm is rotated by the lane slope angle θ (S1, 1) around the detecting position (S1, 1) as its rotating center. The area after rotating the rectangle area RAm by the lane slope angle θ (S1, 1) is the grouping area GA (S1, 1) corresponding to the detecting position (S1, 1). In the setting processing of the grouping area GA, the other grouping area GAs corresponding to the other detecting positions are all set based on the rectangle area RAm.

The width W2 is, for example, the smaller one of half of an estimated width of the own lane and a predetermined width. The estimated width of the own lane is calculated based on the estimated shape of the own lane obtained by the estimate processing by the portion 16. The width W2 may be the smaller one of the predetermined width and half of the sum of the estimated width of the own lane and a distance from the roadside object to the lane compartment line nearest to the same roadside object.

3. Effect by Object Recognition Device According to Second Embodiment

According to the object recognition device according to the second embodiment described above, it is determined whether or not the roadside object exists on the adjacent side strip based on the positional information of the road structure read from the map database 12. If it is determined that the roadside object exists on the adjacent side strip, the size of the rectangle area RA in the direction where the roadside object exists is reduced. Therefore, it is possible to improve precision of the fusion processing by the portion 17 while preventing the occurrence of the erroneous determination in the determination processing by the portion 17c.

What is claimed is:

1. An object recognition device comprising:
a first detection device which is configured to detect information on a first object around an own vehicle as first information;
a second detection device which is configured to detect information on a second object around the own vehicle as second information; and
a object fusion portion which is configured to perform determination processing on whether or not the first object and the second object are the same object based on the first information and the second information,
wherein the object recognition device further comprising a map database containing information on lanes regarding shape and position of lanes,
wherein the object fusion portion includes:
a lane slope angle estimation portion which is configured to perform estimate processing of a slope angle of a lane to a travel direction of the own vehicle; and
a determination area set portion which is configured to perform setting processing of a determination area which is used for the determination processing,
wherein the estimate processing is at least one of the following processing:
processing to estimate a first slope angle of the lane to the travel direction at the detecting position of the first object based on the information on lanes and the detecting position of the first object obtained from the first information; and
processing to estimate a second slope angle of the lane to the travel direction at the detecting position of the second object based on the information on lanes and the detecting position of the second object obtained from the second information,
wherein the setting processing is processing to set the determination area by rotating a first predetermined range including the detecting position of the first object and a second predetermined range including the detecting position of the second object,
wherein, when the first or second slope angle is estimated, the rotation angles of the first and second predetermined ranges are set to the same angle as the first slope angle or the second slope angle, wherein, when the first and the second slope angles are estimated, the rotation angle of the first predetermined range is set to the same as the first slope angle while the rotation angle of the second predetermined range is set to the same angle as the second slope angle.

2. The object recognition device according to claim 1, wherein the map database further includes information on roadside objects, wherein the object recognition device further comprising a roadside object determining portion which is configured to determine whether or not a roadside object exists on a side strip adjacent to a lane on which the own vehicle travels, based on the position of the own vehicle and the information on roadside objects, wherein the determination area set portion is further configured to, when it is determined that the roadside object exists on the adjacent side strip, reduce each width of the first and second predetermined ranges on a side close to the adjacent side strip before rotating the first and second predetermined ranges in the setting processing.

3. The object recognition device according to claim 1, wherein the first slope angle is an angle which is formed by a center line of the lane, obtained from the information on lanes, on which the own vehicle travels and a first tangent line of a first lane compartment line nearest to the detecting position of the first object, wherein a tangent point of the first tangent line is a projection position at which distance from the detecting position of the first object is shortest when the same detecting position is projected onto the first lane compartment line, wherein the second slope angle is an angle which is formed by the center line of the lane and a second tangent line of a second lane compartment line nearest to the detecting position of the second object, wherein a tangent point of the second tangent line is a projection position at which distance from the detecting position of the second object is shortest when the same detecting position is projected onto the second lane compartment line.

* * * * *